(12) United States Patent (10) Patent No.: US 9,021,578 B1
Casaburi et al. (45) Date of Patent: Apr. 28, 2015

(54) SYSTEMS AND METHODS FOR SECURING INTERNET ACCESS ON RESTRICTED MOBILE PLATFORMS

(75) Inventors: Jim Casaburi, Rancho Palos Verdes, CA (US); Alan Gilbert, Lake Elsinore, CA (US); Ryan McGann, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 53 days.

(21) Appl. No.: 13/231,919

(22) Filed: Sep. 13, 2011

(51) Int. Cl.
*G06F 9/00* (2006.01)
*H04L 29/06* (2006.01)

(52) U.S. Cl.
CPC ............ *H04L 63/14* (2013.01); *H04L 63/0272* (2013.01)

(58) Field of Classification Search
CPC ............................ H04L 63/0272; H04L 63/14
USPC .......................................................... 726/15
IPC ........................................ H04L 63/0272, 63/14
See application file for complete search history.

(56) References Cited

U.S. PATENT DOCUMENTS

| | | | | |
|---|---|---|---|---|
| 7,333,453 | B2* | 2/2008 | Wu et al. ........................ | 370/331 |
| 7,602,786 | B2* | 10/2009 | Dommety et al. ............. | 370/392 |
| 7,805,754 | B2* | 9/2010 | Song et al. ........................ | 726/4 |
| 7,933,253 | B2* | 4/2011 | Akram et al. .................. | 370/338 |
| 7,953,671 | B2* | 5/2011 | Bishop et al. .................... | 705/67 |
| 8,359,016 | B2* | 1/2013 | Lindeman et al. ......... | 455/414.1 |
| 2002/0133534 | A1* | 9/2002 | Forslow ........................ | 709/200 |
| 2004/0120295 | A1* | 6/2004 | Liu et al. ....................... | 370/338 |
| 2004/0268148 | A1* | 12/2004 | Karjala et al. ................. | 713/201 |
| 2005/0138416 | A1* | 6/2005 | Qian et al. ..................... | 713/201 |
| 2005/0210150 | A1* | 9/2005 | Bahl .............................. | 709/245 |
| 2005/0265263 | A1* | 12/2005 | Wajda ............................ | 370/259 |
| 2007/0113275 | A1* | 5/2007 | Khanna et al. ................... | 726/15 |
| 2007/0118558 | A1* | 5/2007 | Kahandaliyanage ...... | 707/104.1 |
| 2007/0177550 | A1* | 8/2007 | Kwon et al. .................. | 370/331 |
| 2008/0232382 | A1* | 9/2008 | Iwama et al. ................. | 370/401 |
| 2009/0122990 | A1* | 5/2009 | Gundavelli et al. ........... | 380/278 |
| 2009/0187763 | A1* | 7/2009 | Freericks et al. ............. | 713/167 |
| 2010/0064341 | A1* | 3/2010 | Aldera .............................. | 726/1 |
| 2010/0125668 | A1* | 5/2010 | Bocchieri et al. ............. | 709/228 |
| 2010/0151849 | A1* | 6/2010 | Weinzierl ....................... | 455/419 |
| 2010/0177674 | A1* | 7/2010 | Aggarwal ...................... | 370/312 |

(Continued)

OTHER PUBLICATIONS

Mobicip, Online Safety 2.0; http://www.mobicip.com; Taken from site on Aug. 4, 2011.

(Continued)

*Primary Examiner* — Techane Gergiso
(74) *Attorney, Agent, or Firm* — ALG Intellectual Property, LLC

(57) ABSTRACT

A computer-implemented method for securing Internet access on restricted mobile platforms may include identifying an attempt by a mobile computing system to establish a virtual private network connection with a security server and, in response to identifying the attempt, (1) assigning an Internet Protocol address to the mobile computing system and (2) identifying a security filter customized to filter communications for an account associated with the mobile computing system. The method may also include (1) receiving, via the virtual private network connection, a request for an Internet resource and (2) providing, via the virtual private network connection, a response to the request to the mobile computing system based at least in part on the security filter. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2011/0197287 | A1* | 8/2011 | Hess et al. | 726/30 |
| 2012/0005746 | A1* | 1/2012 | Wei et al. | 726/15 |
| 2012/0131685 | A1* | 5/2012 | Broch et al. | 726/30 |
| 2012/0159578 | A1* | 6/2012 | Chawla et al. | 726/4 |
| 2012/0302204 | A1* | 11/2012 | Gupta et al. | 455/406 |

OTHER PUBLICATIONS

Techrepublic; Secure Web Browsing 1.6 (Mobile); http://www.techrepublic.com/software/secure-web-browsing-16-mobile/1978291; Taken from site on Aug. 4, 2011.

F-Secure; Mobile Security; http://www.f-secure.com/en/web/home_global/protection/mobile-security/system-requirements; Taken from site on Aug. 4, 2011.

Anonymous.To; iPhone Anonymous Surfing; http://anonymous.to/anonymous-iphone-surfing/; Taken from site on Aug. 4, 2011.

Emma Gray; Zoodles Launch Child Safe Browser App for Android Phones; http://www.wmps.com/blog/technology-development/mobile-applications/zoodles-launch-child-safe-browser-app-for-android-phones/; Sep. 9, 2010.

Mobicipnews; Tipe on Child Mobile Internet Safety by Suren Ramasubbu on HealthNewsDigest.com; http://content.mobicip.com/content/tips-child-mobile-internet-safety-suren-ramasubbu-healthnewsdigestcom; Sep. 22, 2010.

healthnewsdigest.com; Tips on Child Mobile Internet Safety; http://healthnewsdigest.com/news/Guest_Columnist_710/Avoid_the_Predator_in_Your_Kid_s_Pocket_printer.shtml; Sep. 21, 2010.

Mozilla; Firefox Add-ons; https://addons.mozilla.org/en-US/firefox/tag/safe%20browsing; Taken from site on Aug. 4, 2011.

Softbank; Protecting Children From Harmful Information; http://www.softbank.co.jp/en/initiatives/csr/internet/instance_01/; Mar. 31, 2011.

* cited by examiner

SYSTEMS AND METHODS FOR SECURING INTERNET ACCESS ON RESTRICTED MOBILE PLATFORMS

BACKGROUND

With the rise of mobile computing, consumers may now access the Internet from anywhere. Mobile computing devices such as cellular telephones, tablet computers, e-book readers, and the like have become a ubiquitous part of everyday life. However, the ability to access the Internet from these devices also brings the various dangers of the Internet to these devices. Malicious web pages may pose phishing attacks to steal confidential information (e.g., user credentials, credit card numbers, etc.) or exploit vulnerabilities in web browser software that may allow malware to be downloaded to a user's mobile computing device. Furthermore, some legitimate Internet resources (through the use of spam, comment posts, etc.) may be used to redirect users to malicious websites.

Traditional computing security solutions may include installing system-level software, such as anti-virus software, on a computing system to monitor activity on the computing system and block, quarantine, and/or eradicate the variety of threats available through an Internet connection. However, some mobile computing platforms are restricted and/or closed, discouraging and/or preventing users from installing software of their choice and/or from installing system-level software that would provide sufficient access for security software to operate effectively. Accordingly, the instant disclosure identifies a need for additional and improved systems and methods for securing Internet access on restricted mobile platforms.

SUMMARY

As will be described in greater detail below, the instant disclosure generally relates to systems and methods for securing Internet access on restricted mobile platforms by tunneling all Internet traffic from mobile computing systems through virtual private network connections to security proxies capable of filtering, modifying, and/or tracking the Internet traffic. In one example, a computer-implemented method for securing Internet access on restricted mobile platforms may include identifying an attempt by a mobile computing system to establish a virtual private network connection with a security server and then, in response to identifying the attempt, (1) assigning an Internet Protocol address to the mobile computing system and (2) identifying a security filter customized to filter communications for an account associated with the mobile computing system. The method may also include (1) receiving, via the virtual private network connection, a request for an Internet resource, and then (2) providing, via the virtual private network connection, a response to the request to the mobile computing system based at least in part on the security filter.

In one example, the mobile computing system may be configured to perform all Internet communications via the virtual private network connection. In some examples, the security server may include a virtual private server designated for use for communications associated with the account.

The computer-implemented method may apply the security filter to the request in any of a variety of ways. For example, providing the response to the request may include (1) determining, based on the security filter, that access to the Internet resource is prohibited for the account and then, in response to determining that access to the Internet resource is prohibited for the account, (2) returning a message to the mobile computing system indicating that the Internet resource is prohibited for the account. In another example, the response to the request may include (1) retrieving the Internet resource based on the request, (2) scanning the retrieved Internet resource for content prohibited for the account as indicated by the security filter, (3) modifying the Internet resource to pass the security filter, and (4) returning the modified Internet resource to the mobile computing system.

In one example, the response to the request may include (1) determining, based on the security filter, that the Internet resource includes untrustworthy content and, in response to the determination, (2) logging the request in association with the account.

In some examples, the security server may handle multiple customized accounts with customized filtering requirements. For example, the computer-implemented method may include identifying an additional attempt by an additional mobile computing system to establish an additional virtual private network connection with the security server, the additional mobile computing system being distinct from the mobile computing system. The method may also include, in response to identifying the additional attempt, (1) assigning an additional Internet Protocol address to the additional mobile computing system, the additional Internet Protocol address being distinct from the Internet Protocol address and (2) identifying an additional security filter customized to filter communications for an additional account associated with the additional mobile computing system, the additional security filter being distinct from the security filter and the additional account being distinct from the account. The method may also include (1) receiving, via the additional virtual private network connection, an additional request for an additional Internet resource and then (2) providing, via the additional virtual private network connection, an additional response to the additional request to the additional mobile computing system based at least in part on the additional security filter.

In one embodiment, a system for implementing the above-described method may include an identification module programmed to identify an attempt by a mobile computing system to establish a virtual private network connection with a security server. The system may also include an assignation module programmed to, in response to identifying the attempt, (1) assign an Internet Protocol address to the mobile computing system and (2) identify a security filter customized to filter communications for an account associated with the mobile computing system. The system may additionally include a receiving module programmed to receive, via the virtual private network connection, a request for an Internet resource. The system may further include a filtering module programmed to provide, via the virtual private network connection, a response to the request to the mobile computing system based at least in part on the security filter. The system may also include at least one processor configured to execute the identification module, the assignation module, the receiving module, and the filtering module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to identify an attempt by a mobile computing system to establish a virtual private network connection with a security server and, in response to identifying the attempt, (1) assign an Internet Protocol address to the mobile computing system and (2) identify a security filter customized to filter communications for an account associated with the mobile computing system. The computer-executable instructions may also cause the computing device to (1) receive, via the virtual private network connection, a request for an Internet resource and (2) provide, via the virtual private network connection, a response to the request to the mobile computing system based at least in part on the security filter.

As will be explained in greater detail below, by tunneling all Internet traffic from mobile computing systems through virtual private network connections to security proxies capable of filtering, modifying, and/or tracking the Internet traffic, the systems and methods described herein may provide comprehensive Internet security features for all applications installed on mobile computing systems while still conforming to strict mobile platform restrictions that may otherwise cripple mobile computing security systems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
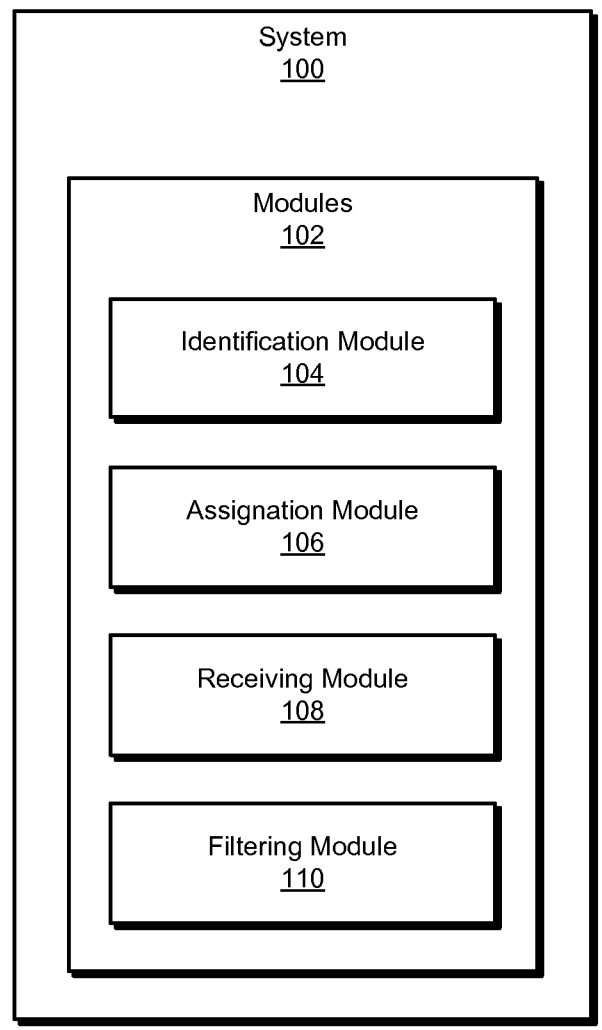
FIG. 1 is a block diagram of an exemplary system for securing Internet access on restricted mobile platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
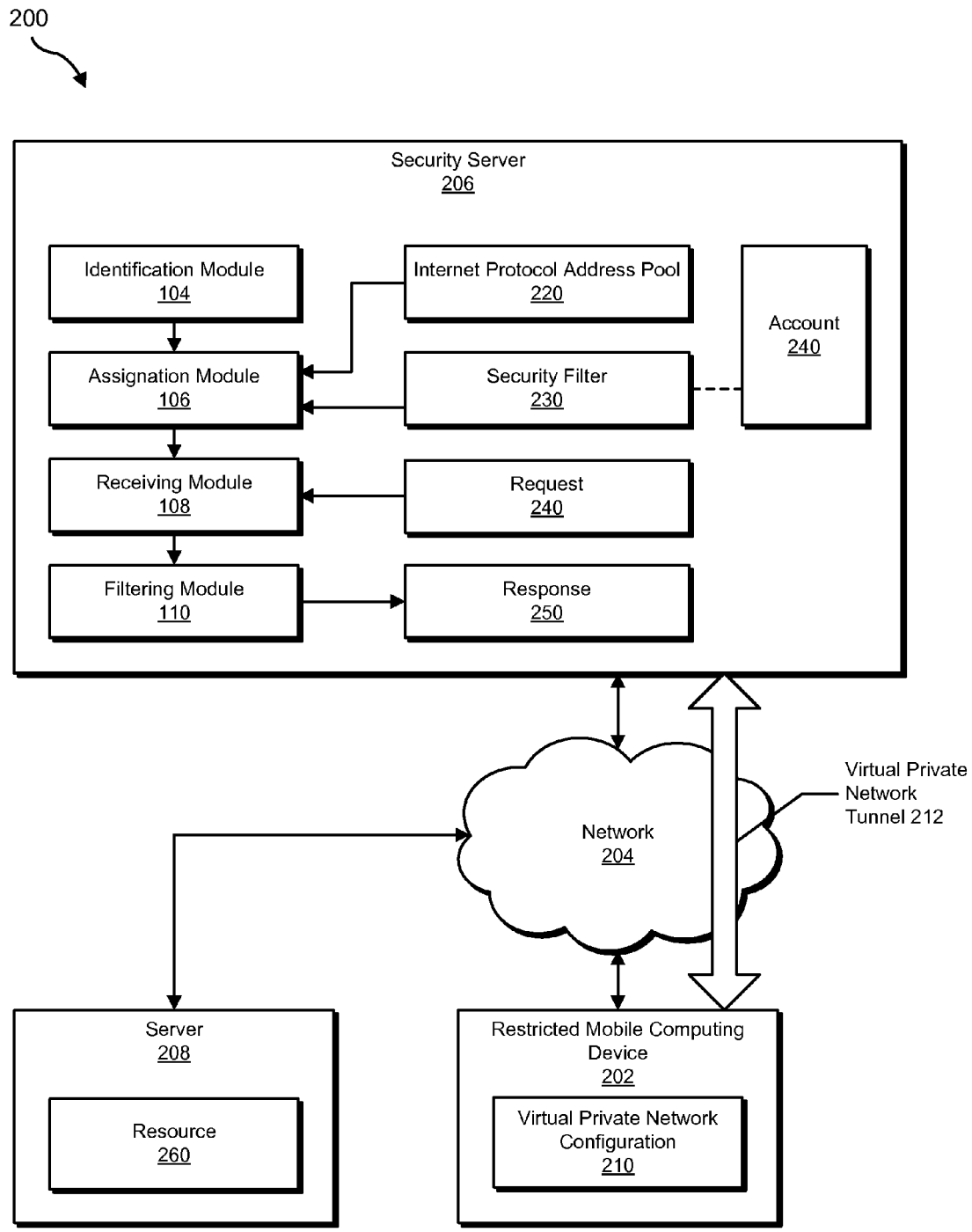
FIG. 2 is a block diagram of an exemplary system for securing Internet access on restricted mobile platforms.
Figure 3:
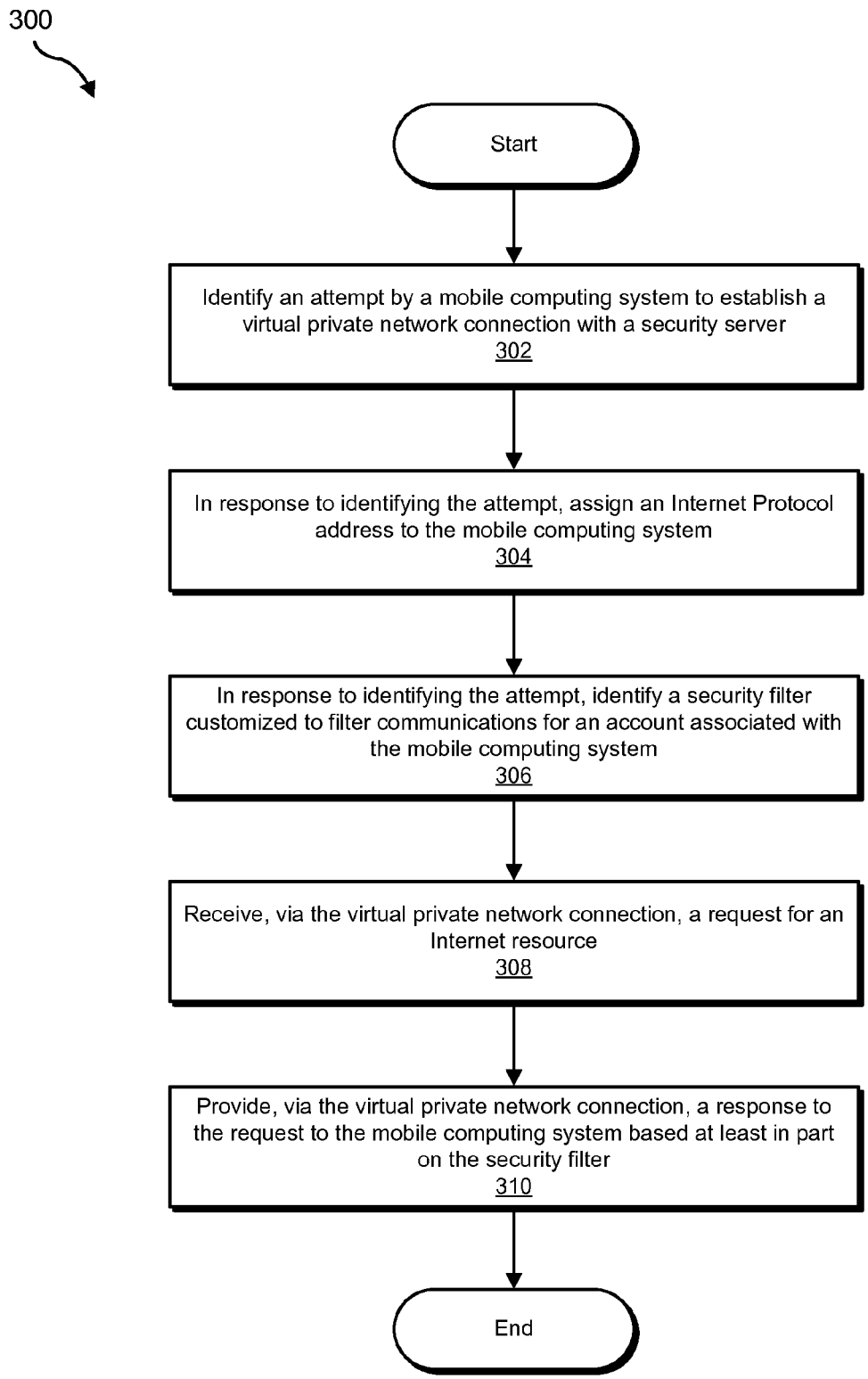
FIG. 3 is a flow diagram of an exemplary method for securing Internet access on restricted mobile platforms.
Figure 4:
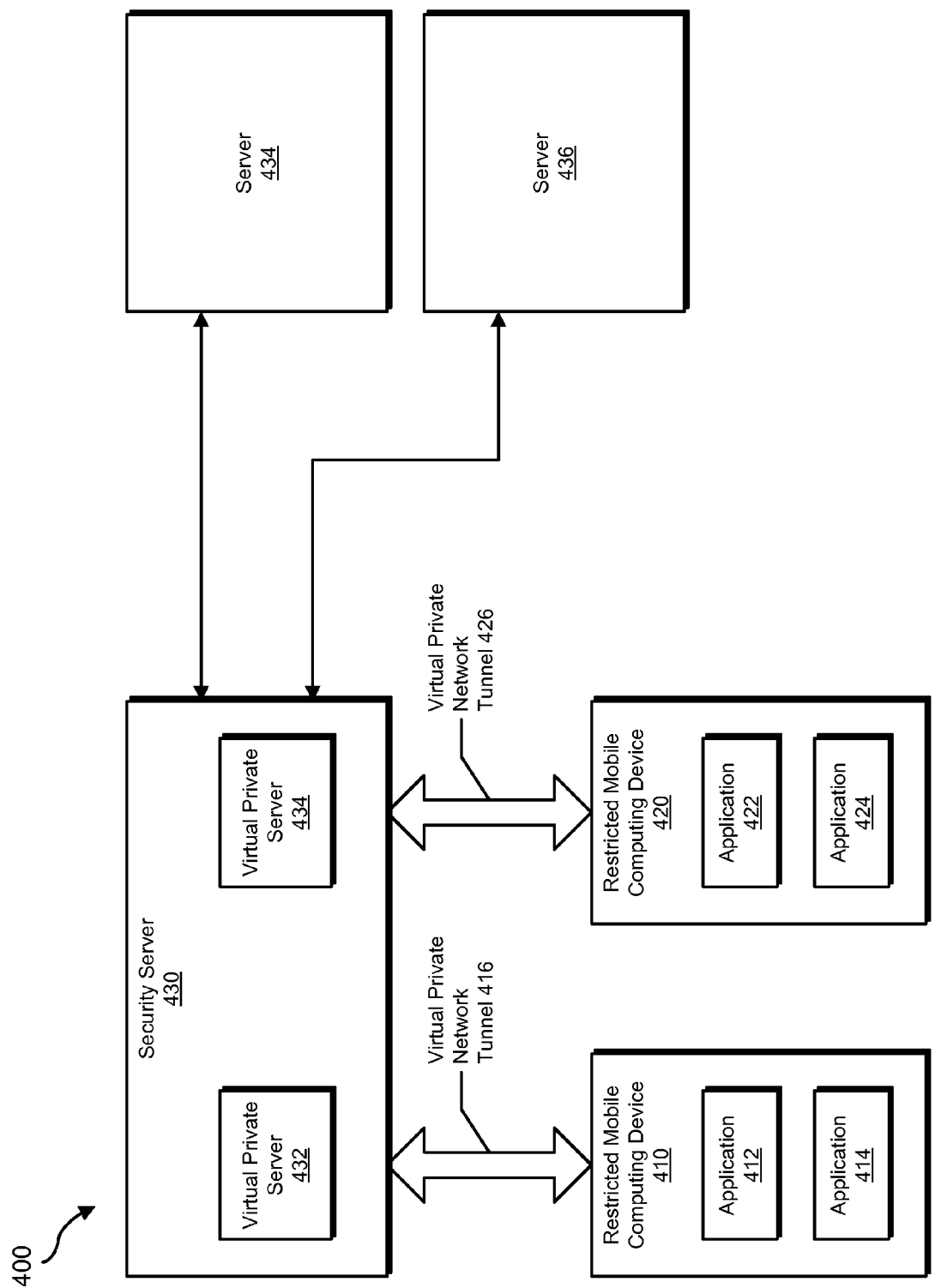
FIG. 4 is a block diagram of an exemplary system for securing Internet access on restricted mobile platforms.

The following will provide, with reference to FIGS. 1, 2, and 4, detailed descriptions of exemplary systems for securing Internet access on restricted mobile platforms. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for securing Internet access on restricted mobile platforms. As illustrated in this figure, exemplary system 100 may include one or more modules 102 for performing one or more tasks. For example, and as will be explained in greater detail below, exemplary system 100 may include an identification module 104 programmed to identify an attempt by a mobile computing system to establish a virtual private network connection with a security server. Exemplary system 100 may also include an assignation module 106 programmed to, in response to identifying the attempt, (1) assign an Internet Protocol address to the mobile computing system and (2) identify a security filter customized to filter communications for an account associated with the mobile computing system.

In addition, and as will be described in greater detail below, exemplary system 100 may include a receiving module 108 programmed to receive, via the virtual private network connection, a request for an Internet resource. Exemplary system 100 may additionally include a filtering module 110 programmed to provide, via the virtual private network connection, a response to the request to the mobile computing system based at least in part on the security filter. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., restricted mobile computing device 202 and/or security server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a restricted mobile computing device 202 in communication with a security server 206 via a network 204. System 200 may also include a server 208 in communication with security server 206 via network 204.

In one embodiment, one or more of modules 102 from FIG. 1 may, when executed by at least one processor security server 206, facilitate security server 206 in securing Internet access on restricted mobile platforms. For example, and as will be described in greater detail below, one or more of modules 102 may cause security server 206 to identify an attempt by restricted mobile computing device 202 to establish a virtual private network tunnel 212 with security server 206 and, in response to identifying the attempt, (1) assign an Internet Protocol address (e.g., from an Internet Protocol address pool 220) to restricted mobile computing device 202 and (2) identify a security filter 230 customized to filter communications for an account 240 associated with restricted mobile computing device 202. Modules 102 may also cause security server to (1) receive, via virtual private network tunnel 212, a request 240 for a resource 260 from server 208 and (2) provide, via virtual private network tunnel 212, a response 250 to request 240 to mobile computing device 202 based at least in part on security filter 230.

Restricted mobile computing device 202 generally represents any type or form of computing device capable of reading computer-executable instructions. Examples of restricted mobile computing device 202 include, without limitation, cellular phones, tablet computing devices, e-book readers, personal digital assistants (PDAs), netbooks, multimedia players, embedded systems, combinations of one or more of the same, exemplary computing system 510 in FIG. 5, or any other suitable computing device.

Security server 206 generally represents any type or form of computing device that is capable of establishing secure network connections, filtering Internet communications, and/or providing proxy services.

Server 208 generally represents any type or form of computing device that is capable of hosting Internet resources such as services and electronic documents. Examples of server 208 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between restricted mobile computing device 202 and security server 206 and/or between security server 206 and server 208.

FIG. 3 is a flow diagram of an exemplary computer-implemented method 300 for securing Internet access on restricted mobile platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an attempt by a mobile computing system to establish a virtual private network connection with a security server. For example, at step 302 identification module 104 may, as part of security server 206 in FIG. 2, identify an attempt by restricted mobile computing device 202 to establish virtual private network tunnel 212 with security server 206.

As previously noted, a mobile computing system may include a mobile phone, a tablet computer, an e-book reader, a personal digital assistant, and the like. The phrase "mobile computing system" may also generally refer to any other portable device that may have wireless connectivity to the Internet. Mobile-computing systems may include GPS devices, messaging devices, and various other types of mobile devices.

In some examples, the mobile computing system may use a restricted mobile platform that may interfere with some traditional methods for Internet security. For example, the mobile computing system may restrict modifications to system-level and/or base functionality. In some examples, the restricted mobile platform may limit the ability of third-party software to inspect network traffic, modify the behavior of other applications, and/or modify data in movement and/or at rest. The restricted mobile platform may enforce these limitations as a part of the hardware of mobile computing system and/or as a part of the operating system of the mobile computing device. In some examples, the restricted mobile platform may extend to an application store with exclusive privileges to allow certain configurations and/or software installations on the mobile computing system. In some examples, restrictions on the mobile platform may be enforced by decisions regarding whether to make an application available and/or visible in the application store. In some examples, restrictions on the mobile platform may hamper the use of third-party security software on the mobile platform by making use of the third-party security software difficult and/or costly, and/or by reducing features and/or the reliability of the mobile platform when third-party security software is installed. As an example, the mobile computing system may run on the APPLE IOS platform.

In some examples, the mobile computing system may be configured to perform all Internet communications via the virtual private network connection. For example, the mobile computing system may be configured to perform Internet communications for native applications and/or services installed on the mobile computing system (e.g., applications and services pre-installed on the mobile computing system, included on the mobile computing system at the time of first sale to the end consumer, and/or included by an organization that sells and/or distributes the mobile computing system and/or the mobile computing platform of the mobile computing system) via the virtual private network connection. In some examples, the mobile computing system may be configured to perform Internet communications for system-level services via the virtual private network connection. Additionally or alternatively, the mobile computing system may be configured to perform Internet communications for third-party applications and/or services (e.g., applications and services installed by an end user, not pre-installed on the mobile computing system, and/or not developed and/or distributed by an organization that is associated with the mobile computing system and/or the mobile computing platform of the mobile computing system).

The mobile computing system may be configured to use the virtual private network connection in any of a variety of contexts. For example, a user of the mobile computing system may configure the mobile computing system to use the virtual private network. Additionally or alternatively, one or more of the systems described herein may send configuration data and/or an application to automatically configure the mobile computing system to use the virtual private network connection. In some examples, one or more of the systems described herein may send an application to guide a user through configuring the mobile computing system to use the virtual private network connection.

As used herein, the phrase "virtual private network" may refer to any networking technique allowing remote computing systems to securely and/or privately communicate. In some examples, a "virtual private network" may encrypt data transmitted between remote computing systems. For example, a "virtual private network" may use one or more cryptographic tunneling protocols for communications between remote computing systems. In some examples, a "virtual private network" may prevent interception, packet sniffing, identity spoofing, and message alteration.

In some examples, the security server may include a virtual private server designated for use for communications associated with the account. For example, the security server may include a hosted virtual machine configured to communicate with and/or on behalf of the mobile computing system. In some examples, the security server may operate as an endpoint of the virtual private network connection and as a gateway to the Internet. In some examples, the security server may include an integrated virtual private network engine and filtering proxy engine. For example, the security server may have access both to which Internet Protocol address is assigned to each account (e.g., for Internet communications performed on behalf of the mobile computing system) and what filtering rule set is to be applied to each account for filtering Internet communications.

Returning to step 302, identification module 104 may identify the attempt by the mobile computing system in any suitable manner. For example, identification module 104 may identify the attempt by receiving a request to establish a virtual private network with the mobile computing system. Additionally or alternatively, identification module 104 may identify the attempt by receiving a message from a virtual private networking subsystem on the security server.

FIG. 4 is an illustration of an exemplary system 400 for securing Internet access on restricted mobile platforms. As shown in FIG. 4, system 400 may include a restricted mobile computing device 410 and a restricted mobile computing device 420 in communication with a security server 430 via virtual private network tunnels 416 and 426, respectively. Security server 430 may communicate with servers 434 and 436 on behalf of restricted mobile computing devices 410 and 420, respectively. Using FIG. 4 as an example for step 302, at step 302 identification module 104 may, as a part of security server 430, identify an attempt by restricted mobile computing device 410 to establish virtual private network tunnel 416 with security server 430.

In some examples, the security server may support security proxy services for multiple mobile computing systems. For example, identification module 104 may also identify an additional attempt by an additional mobile computing system to establish an additional virtual private network connection with the security server, the additional mobile computing system being distinct from the mobile computing system. Using FIG. 4 as an example, identification module 104 may, as a part of security server 430, identify an attempt by restricted mobile computing device 420 to establish virtual private network tunnel 426 with security server 430.

Returning to FIG. 3, at step 304 one or more of the systems described herein may, in response to the attempt, assign an Internet Protocol address to the mobile computing system. For example, at step 304 assignation module 106 may, as part of security server 206 in FIG. 2, assign an Internet Protocol address (e.g., from an Internet Protocol address pool 220) to restricted mobile computing device 202.

Assignation module 106 may assign the Internet Protocol address to the mobile computing system in any suitable manner. In some examples, assignation module 106 may access to a pool of available Internet Protocol addresses. In these examples, assignation module 106 may select an Internet Protocol address from the pool for the mobile computing system. In some examples, assignation module 106 may assign the Internet Protocol address to the mobile computing system by associating the Internet Protocol address with an identifier of the mobile computing system (e.g., an Internet Protocol address used by the mobile computing system to communicate with the security server). Additionally or alternatively, assignation module 106 may assign the Internet Protocol address to the mobile computing system simply by using the Internet Protocol address in Internet communications conducted on behalf of the mobile computing system.

As mentioned earlier, in some examples, the security server may support security proxy services for multiple mobile computing systems. For example, identification module 104 may also identify an additional attempt by an additional mobile computing system to establish an additional virtual private network connection with the security server, the additional mobile computing system being distinct from the mobile computing system. In these examples, assignation module 106 may, in response to identifying the additional attempt, assign an additional Internet Protocol address to the additional mobile computing system, the additional Internet Protocol address being distinct from the Internet Protocol address. Using FIG. 4 as an example, security server 430 may assign an Internet Protocol address to restricted mobile computing device 410 and may assign a different Internet Protocol address to restricted mobile computing device 420. As will be explained in greater detail below, security server 430 may use the assigned Internet Protocol addresses when relaying communications from the respective restricted mobile computing devices to the wider Internet.

Returning to FIG. 3, at step 306 one or more of the systems described herein may, in response to the attempt, identify a security filter customized to filter communications for an account associated with the mobile computing system. For example, at step 306 assignation module 106 may, as part of security server 206 in FIG. 2, identify security filter 230 customized to filter communications for account 240 associated with restricted mobile computing device 202.

The security filter may include any of a variety of criteria, methods, rules, and/or formulas for analyzing, categorizing, and/or modifying communications between the mobile computing system and the Internet. In some examples, the security filter may include a malware filter for detecting and/or isolating malware and/or insecure links, files, and/or documents which may lead to and/or result in malware. Additionally or alternatively, the security filter may include a phishing filter for detecting unwanted attempts to gather sensitive data from the mobile computing system and/or a user of the mobile computing system. In some examples, the security filter may also include a broader content-based filter for filtering inappropriate content (e.g., obscene content, age-inappropriate content, content inappropriate for a workplace, etc.).

The account may be associated with the mobile computing system in any of a variety of ways. In some examples, the mobile computing system may transmit a unique identifier and/or authentication information to the security server to assert that the user of the mobile computing system owns the account. In some examples, one or more of the systems described herein may present an interface to a user and/or administrator to configure the security filter for the account.

As mentioned earlier, in some examples, the security server may support security proxy services for multiple mobile computing systems. For example, assignation module 106 may, in response to identifying the additional attempt, assign an additional Internet Protocol address to the additional mobile computing system, the additional Internet Protocol address being distinct from the Internet Protocol address. In these examples, assignation module 106 may also, in response to identifying the additional attempt, identify an additional security filter customized to filter communications for an additional account associated with the additional mobile computing system, the additional security filter being distinct from the security filter and the additional account being distinct from the account. Using FIG. 4 as an example, security server 430 may maintain separate accounts, and, accordingly, separate and distinct security filters for restricted mobile computing device 410 and restricted computing device 420. Accordingly, security server 430 may filter communications for restricted mobile computing device 410 only for security threats, but may filter communications for restricted mobile computing device 420 for both security threats and inappropriate content.

Returning to FIG. 3, at step 308 one or more of the systems described herein may receive, via the virtual private network connection, a request for an Internet resource. For example, at step 308 receiving module 108 may, as part of security server 206 in FIG. 2, receive, via virtual private network tunnel 212, request 240 for resource 260 from server 208.

The request for the Internet resource may generally include any Internet communication. For example, the request for the Internet resource may include a request to retrieve a web page and/or a document from a web server. Additionally or alternatively, the request for the Internet resource may include an attempt to send and/or retrieve an email. Generally, the request for the Internet resource may include any attempt to send and/or receive data (e.g., file sharing, remote application data transmission, etc.).

As mentioned earlier, in some examples, the security server may support security proxy services for multiple mobile computing systems. For example, assignation module 106 may, in response to identifying the additional attempt, identify an additional security filter customized to filter communications for an additional account associated with the additional mobile computing system, the additional security filter being distinct from the security filter and the additional account being distinct from the account. In this example, receiving module 108 may also receive, via the additional virtual private network connection, an additional request for an additional Internet resource. Using FIG. 4 as an example, security server 430 may receive a request from restricted mobile computing device 410 via virtual private network tunnel 416 for a resource from server 434, and may also receive a request from restricted mobile computing device 420 via virtual private network tunnel 426 for a resource from server 436.

Returning to FIG. 3, at step 310 one or more of the systems described herein may provide, via the virtual private network connection, a response to the request to the mobile computing system based at least in part on the security filter. For example, at step 310 filtering module 110 may, as part of security server 206 in FIG. 2, provide, via virtual private network tunnel 212, response 250 to request 240 to mobile computing device 202 based at least in part on security filter 230.

Filtering module 110 may use the security filter to respond to the request in any of a variety of contexts. For example, filtering module 110 may apply the security filter to the request itself. In this example, filtering module 110 may analyze the request (including, e.g., the ultimate intended destination of the request) to determine the disposition of the request. For example, filtering module 110 may identify a known malicious web site within the request and respond to the request without forwarding the request to the known malicious web site. Additionally or alternatively, filtering module 110 may forward the request to a server hosting the resource and apply the security filter to a response from the server (e.g., to documents, files, and/or any other data that the server sent to the assigned Internet Protocol address in response to the request).

Filtering module 110 may use the security filter to respond to the request in any of a variety of ways. For example, filtering module 110 may determine, based on the security filter, that access to the Internet resource is prohibited for the account and, in response to determining that access to the Internet resource is prohibited for the account, return a message to the mobile computing system indicating that the Internet resource is prohibited for the account. The message may indicate that the Internet resource is prohibited in any suitable manner. For example, the message may include a human-readable message to notify a user of the mobile computing system of insecure and/or inappropriate content. Additionally or alternatively, the message may include a programmatic message for an application on the mobile computing system that sent the request indicating that the request has been denied or could not otherwise be fulfilled. In some examples, the message may include and/or cause the mobile computing system to display an override feature allowing a user of the mobile computing system to access the resource after acknowledging a warning.

In another example, filtering module 110 may respond to the request by (1) retrieving the Internet resource based on the request, (2) scanning the retrieved Internet resource for content prohibited for the account as indicated by the security filter, (3) in response to scanning the retrieved Internet resource, modifying the Internet resource to pass the security filter, and (4) returning the modified Internet resource to the mobile computing system. For example, filtering module 110 may determine that a web page is generally safe, but that a link on the web page (e.g., posted in a comment section of a trusted web site) is malicious. In this example, filtering module 110 may modify the Internet resource by removing the link from the web page, changing the link from a hyperlink element to plain text, adding a visual warning to the link, etc.

In one example, filtering module 110 may respond to the request by determining, based on the security filter, that the Internet resource includes untrustworthy content and, in response to the determination, logging the request in association with the account. For example, filtering module 110 may determine that the request was directed to a malicious resource. In this example, filtering module 110 may log the request in order to warn a user of the mobile computing system about the malicious resource and/or a previous resource that led the user to the malicious resource. As another example, filtering module 110 may determine with low confidence that the requested resource includes inappropriate content. In this example, filtering module 110 may fulfill the request by sending the resource to the mobile computing system, but may log the request and/or the resource for further examination.

As mentioned earlier, in some examples, the security server may support security proxy services for multiple mobile computing systems. For example, receiving module 108 may receive, via the additional virtual private network connection, an additional request for an additional Internet resource. In this example, filtering module 110 may also provide, via the additional virtual private network connection, an additional response to the additional request to the additional mobile computing system based at least in part on the additional security filter. Using FIG. 4 as an example, security server 430 may respond to a request from restricted mobile computing device 410 via virtual private network tunnel 416 for a resource from server 434, and may also respond to a request from restricted mobile computing device 420 via virtual private network tunnel 426 for a resource from server 436. After step 310 method 300 may terminate.

In some examples, the systems and methods described herein may determine that the mobile computing system is forming or has formed a secure connection with another server. For example, these systems and methods may (1) receive, via the virtual private network connection, a request to establish a secure connection with an additional server, (2) determine, based on the request to establish the secure connection with the additional server, that the secure connection is not subject to the security filter, and, in response to determining that the secure connection is not subject to the security filter, (3) relay, via the virtual private network connection, communications between the mobile computing system and the additional server via the secure connection without applying the security filter to the communications. The secure connection may include any connection that may interfere with the ability to inspect the content of communications sent via the secure connection. For example, the secure connection may include a Hypertext Transfer Protocol Secure ("HTTPS") connection. In some examples, the systems and methods described herein may log the information about the secure connection and/or report the secure connection to an administrator.

As explained above, by tunneling all Internet traffic from mobile computing systems through virtual private network connections to security proxies capable of filtering, modifying, and/or tracking the Internet traffic, the systems and methods described herein may provide comprehensive Internet security features for all applications installed on mobile computing systems while still conforming to strict mobile platform restrictions that may otherwise cripple mobile computing security systems.

Figure 5:
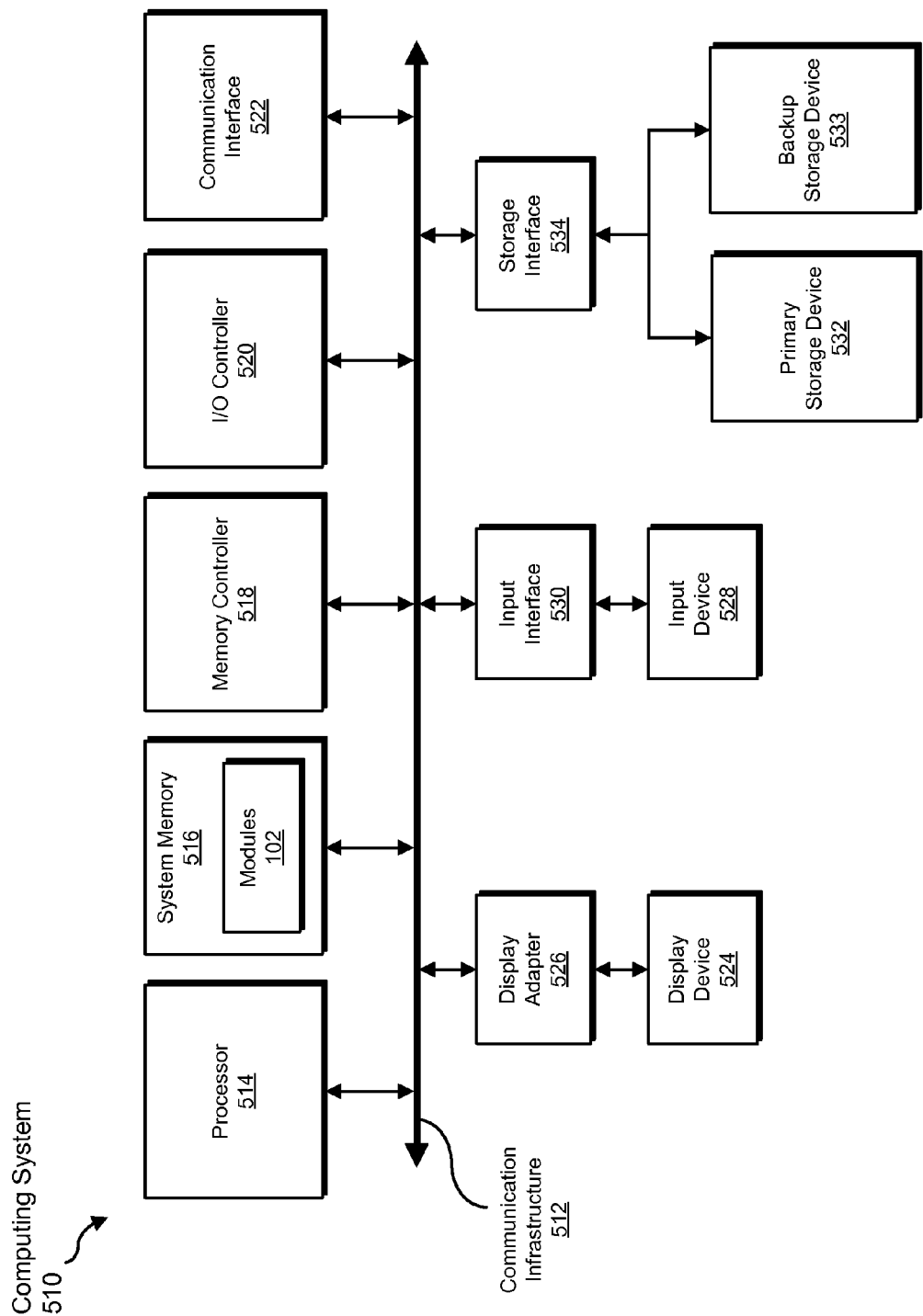
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, assigning, receiving, providing, determining, returning, retrieving, scanning, modifying, logging, and/or relaying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
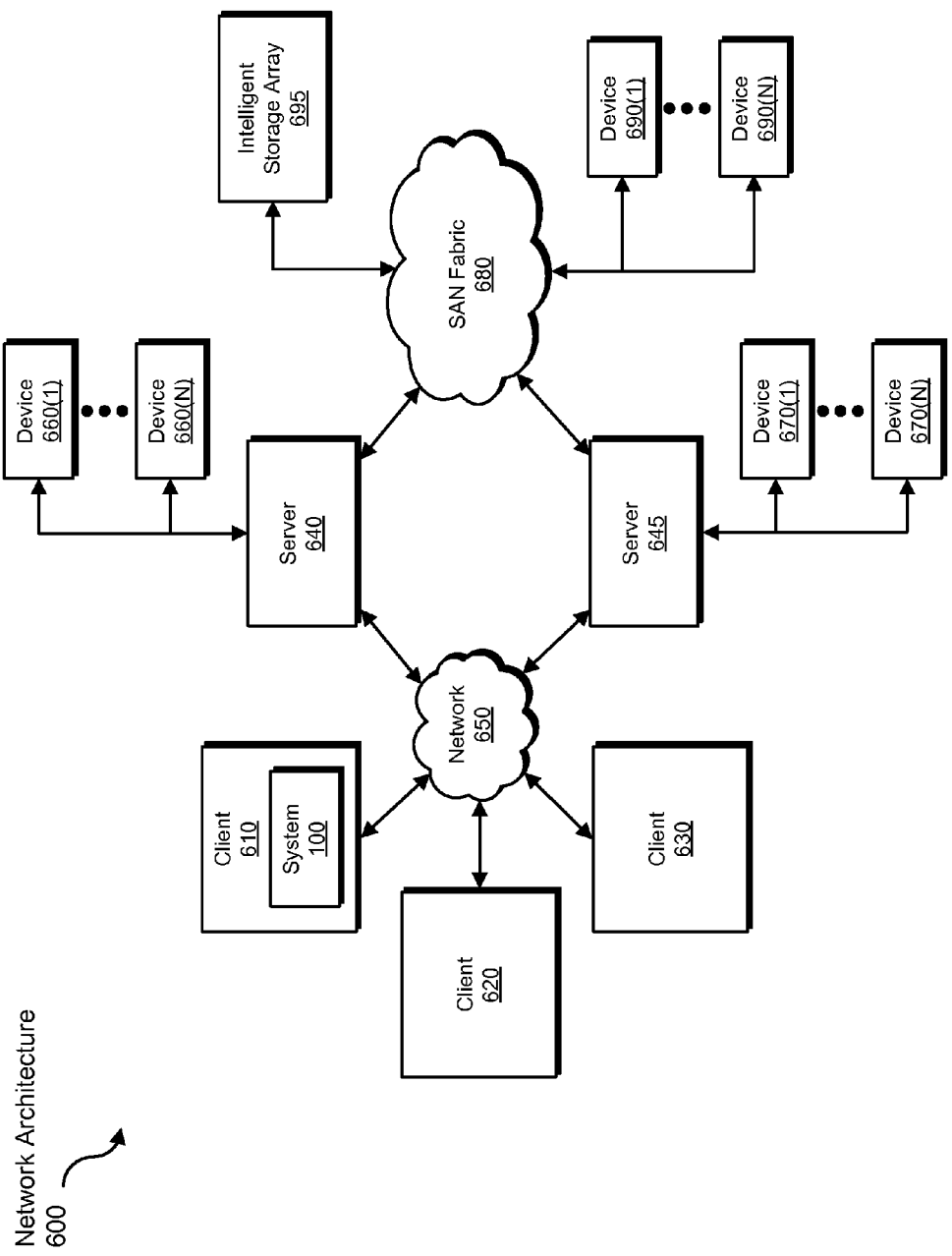
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, assigning, receiving, providing, determining, returning, retrieving, scanning, modifying, logging, and/or relaying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690

(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for securing Internet access on restricted mobile platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a mobile computing system into a secure mobile computing system. As another example, one or more of the modules recited herein may transform a server into a server for facilitating secure communications from restricted mobile platforms.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securing Internet access on restricted mobile platforms, at least a portion of the method being performed by a computing device comprising at least one processor, the method comprising:
   identifying an attempt, by a mobile device that uses a restricted mobile platform, to establish a virtual private network connection with a security server, wherein the restricted mobile platform prevents a user of the mobile device from installing, on the mobile device, a third-party application that is capable of filtering Internet communications of other applications installed on the mobile device;
   in response to identifying the attempt:
   assigning an Internet Protocol address to the mobile device;
   identifying, at the security server, a content-based security filter customized to filter communications at the security server for an account associated with the mobile device based on the content of the communications;
   receiving, at the security server from the mobile device via the virtual private network connection, a request for an Internet resource;
   providing, via the security server via the virtual private network connection, a response to the request to the mobile device based at least in part on the content-based security filter customized to filter communications at the security server for the account associated with the mobile device.

2. The computer-implemented method of claim 1, further comprising:
   identifying an additional attempt, by an additional mobile device that uses the restricted mobile platform, to establish an additional virtual private network connection with the security server, the additional mobile device being distinct from the mobile device;
   in response to identifying the additional attempt:
   assigning an additional Internet Protocol address to the additional mobile device, the additional Internet Protocol address being distinct from the Internet Protocol address;

identifying, at the security server, an additional content-based security filter customized to filter communications at the security server for an additional account associated with the additional mobile device, the additional content-based security filter being distinct from the content-based security filter and the additional account being distinct from the account;

receiving, at the security server via the additional virtual private network connection, an additional request for an additional Internet resource;

providing, via the security server via the additional virtual private network connection, an additional response to the additional request to the additional mobile device based at least in part on the additional content-based security filter.

3. The computer-implemented method of claim 1, wherein the security server comprises a virtual private server designated for use for filtering communications associated with the account.

4. The computer-implemented method of claim 1, wherein providing the response based at least in part on the content-based security filter comprises:

determining, at the security server based on the content-based security filter, that access to the Internet resource is prohibited for the account;

in response to determining that access to the Internet resource is prohibited for the account, returning, via the security server, a message to the mobile device indicating that the Internet resource is prohibited for the account.

5. The computer-implemented method of claim 1, wherein providing the response based at least in part on the content-based security filter comprises:

retrieving, at the security server, the Internet resource based on the request;

scanning, at the security server, the retrieved Internet resource for content prohibited for the account as indicated by the content-based security filter;

in response to scanning the retrieved Internet resource, modifying, at the security server, the Internet resource to pass the content-based security filter;

returning, via the security server, the modified Internet resource to the mobile device.

6. The computer-implemented method of claim 1, wherein providing the response based at least in part on the content-based security filter comprises:

determining, at the security server based on the content-based security filter, that the Internet resource comprises untrustworthy content;

in response to determining that the Internet resource comprises untrustworthy content, logging, at the security server, the request in association with the account.

7. The computer-implemented method of claim 1, wherein:

the mobile device is configured to send and receive all Internet communications via the virtual private network connection;

the security server is configured to apply the content-based security filter to all Internet communications sent to and received from the mobile device via the virtual private network connection.

8. The computer-implemented method of claim 1, wherein:

the mobile device comprises a mobile phone;

the content-based security filter comprises a phishing filter configured to filter communications related to a phishing attack that attempts to gather sensitive data from the mobile phone.

9. A system for securing Internet access on restricted mobile platforms, the system comprising:

an identification module programmed to identify an attempt, by a mobile device that uses a restricted mobile platform, to establish a virtual private network connection with a security server, wherein the restricted mobile platform prevents a user of the mobile device from installing, on the mobile device, a third-party application that is capable of filtering Internet communications of other applications installed on the mobile device;

an assignation module programmed to, in response to identifying the attempt:

assign an Internet Protocol address to the mobile device;

identify, at the security server, a content-based security filter customized to filter communications at the security server for an account associated with the mobile device based on the content of the communications;

a receiving module programmed to receive, at the security server from the mobile device via the virtual private network connection, a request for an Internet resource;

a filtering module programmed to provide, via the security server via the virtual private network connection, a response to the request to the mobile device based at least in part on the content-based security filter customized to filter communications at the security server for the account associated with the mobile device;

at least one processor configured to execute the identification module, the assignation module, the receiving module, and the filtering module.

10. The system of claim 9, wherein:

the identification module is further programmed to identify an additional attempt, by an additional mobile device that uses the restricted mobile platform, to establish an additional virtual private network connection with the security server, the additional mobile device being distinct from the mobile device;

the assignation module is further programmed to, in response to identifying the additional attempt:

assign an additional Internet Protocol address to the additional mobile device, the additional Internet Protocol address being distinct from the Internet Protocol address;

identify, at the security server, an additional content-based security filter customized to filter communications at the security server for an additional account associated with the additional mobile device, the additional content-based security filter being distinct from the content-based security filter and the additional account being distinct from the account;

the receiving module is further programmed to receive, at the security server via the additional virtual private network connection, an additional request for an additional Internet resource;

the filtering module is further programmed to provide, via the security server via the additional virtual private network connection, an additional response to the additional request to the additional mobile device based at least in part on the additional content-based security filter.

11. The system of claim 9, wherein the security server comprises a virtual private server designated for use for filtering communications associated with the account.

12. The system of claim 9, wherein the filtering module is programmed to provide the response based at least in part on the content-based security filter by:

determining, at the security server based on the content-based security filter, that access to the Internet resource is prohibited for the account;

in response to determining that access to the Internet resource is prohibited for the account, returning, via the security server, a message to the mobile device indicating that the Internet resource is prohibited for the account.

13. The system of claim 9, wherein the filtering module is programmed to provide the response based at least in part on the content-based security filter by:

retrieving, at the security server, the Internet resource based on the request;

scanning, at the security server, the retrieved Internet resource for content prohibited for the account as indicated by the content-based security filter;

in response to scanning the retrieved Internet resource, modifying, at the security server, the Internet resource to pass the content-based security filter;

returning, via the security server, the modified Internet resource to the mobile device.

14. The system of claim 9, wherein the filtering module is programmed to provide the response based at least in part on the content-based security filter by:

determining, at the security server based on the content-based security filter, that the Internet resource comprises untrustworthy content;

in response to determining that the Internet resource comprises untrustworthy content, logging, at the security server, the request in association with the account.

15. The system of claim 9, wherein:

the mobile device is configured to send and receive all Internet communications via the virtual private network connection;

the filtering module is programmed to apply, at the security server, the content-based security filter to all Internet communications sent to and received from the mobile device via the virtual private network connection.

16. The system of claim 9, wherein:

the mobile device comprises a mobile phone;

the content-based security filter comprises a phishing filter configured to filter communications related to a phishing attack that attempts to gather sensitive data from the mobile phone.

17. A non-transitory computer-readable-storage medium comprising one or more computer-executable instructions that, when executed by at least one processor of a computing device, cause the computing device to:

identify an attempt by a mobile device that uses a restricted mobile platform, to establish a virtual private network connection with a security server, wherein the restricted mobile platform prevents a user of the mobile device from installing, on the mobile device, a third-party application that is capable of filtering Internet communications of other applications installed on the mobile device;

in response to identifying the attempt:
assign an Internet Protocol address to the mobile device;

identify, at the security server, a content-based security filter customized to filter communications at the security server for an account associated with the mobile device based on the content of the communications;

receive, at the security server from the mobile device via the virtual private network connection, a request for an Internet resource;

provide, via the security server via the virtual private network connection, a response to the request to the mobile device based at least in part on the content-based security filter customized to filter communications at the security server for the account associated with the mobile device.

18. The non-transitory computer-readable storage medium of claim 17, wherein the one or more computer-executable instructions further cause the computing device to:

identify an additional attempt, by an additional mobile device that uses the restricted mobile platform, to establish an additional virtual private network connection with the security server, the additional mobile device being distinct from the mobile device;

in response to identifying the additional attempt:

assign an additional Internet Protocol address to the additional mobile device, the additional Internet Protocol address being distinct from the Internet Protocol address;

identify, at the security server, an additional content-based security filter customized to filter communications at the security server for an additional account associated with the additional mobile device, the additional content-based security filter being distinct from the content-based security filter and the additional account being distinct from the account;

receive, at the security server via the additional virtual private network connection, an additional request for an additional Internet resource;

provide, via the security server via the additional virtual private network connection, an additional response to the additional request to the additional mobile device based at least in part on the additional content-based security filter.

19. The non-transitory computer-readable storage medium of claim 17, wherein the security server comprises a virtual private server designated for use for filtering communications associated with the account.

20. The non-transitory computer-readable storage medium of claim 17, wherein the one or more computer-executable instructions cause the computing device to provide the response based at least in part on the content-based security filter by causing the computing device to:

determine, at the security server based on the content-based security filter, that access to the Internet resource is prohibited for the account;

in response to determining that access to the Internet resource is prohibited for the account, return, via the security server, a message to the mobile device indicating that the Internet resource is prohibited for the account.

* * * * *